INVENTORS.
CHARLES CHRISTIANSON
MORRIS GILMAN
RALPH C. MAGGIO
BY
Ernest J Weinberger
ATTORNEY INVENTORS.
CHARLES CHRISTIANSON
MORRIS GILMAN
RALPH C. MAGGIO
BY
Ernest J Weinberger
ATTORNEY

United States Patent Office 3,114,042
Patented Dec. 10, 1963

3,114,042
DETECTOR FOR RADIOACTIVE HYDROGEN
Charles Christianson, 1192 Walton Ave., Bronx 52, N.Y.;
Morris Gilman, 156 West End Ave., Brooklyn 35,
N.Y.; and Ralph C. Maggio, 2175 Hudson Terrace,
Fort Lee, N.J.
Filed Dec. 27, 1960, Ser. No. 78,786
12 Claims. (Cl. 250—83.6)

The invention described herein may be manufactured and used by or for the Government of the United States of America for governmental purposes without the payment of any royalties thereon or therefor.

This invention relates in general to Geiger-Muller tubes and similar devices employed for the measurement of radioactive radiation, and more particularly to the design of a counter tube capable of detecting radioactive hydrogen in the presence of other gases and atmospheres.

With the advent of nuclear research and development it has become increasingly necessary to be able to accurately detect, individually various radioactive gases, as for example, radioactive hydrogen which may exist in any sampled atmosphere. Present methods of detecting radioactive hydrogen involve complex modifications of existing equipment without attaining accuracy that is generally desired and necessary, under present day conditions. In addition to other reasons, the detection of radioactive hydrogen is essential in that it constitutes a health hazard to those involved in its handling or others who may unwittingly become exposed. Various methods have been proposed and devices constructed for the detection of radioactive hydrogen but all of these lack certain essential requirements and so are unsatisfactory. Notable among these techniques are ionization chambers and scintillation crystal systems. Modified ionization chambers although sensitive to radioactive hydrogen are large, bulky and require additional complex electronic circuitry while still unable to discriminate between the presence of radioactive hydrogen and other radioactive substances and contaminants. Moreover the chambers are affected by, and sensitive to, barometric pressure, humidity and temperature variations and can be activated by areosols such as ordinary smoke or particles in the atmosphere. Scintillation crystal techniques require specially designed complex photomultiplier tubes and associated circuitry in order to be compatible for the detection of radioactive hydrogen and still cannot be employed therein without being responsive to other radioactive gases. Further problems are encountered in that where such scintillation procedures are to be employed the scintillation material must be prepared under exacting conditions and in the form of extremely thin layers, which preparation is difficult. Summarizing the present possible techniques, they are all costly, time consuming in preparation, calibration, and actual use and most important, not selectively responsive to radioactive hydrogen alone.

An object of this invention is to provide an accurate and sensitive detector of radioactive hydrogen where the hydrogen may be in an atmoesphere containing other radioactive substances, gases and aerosols.

Another object is to provide an electrically and mechanically efficient, simple, inexpensive selective counter and detector for radioactive hydrogen in the presence of other radioactive substances, which may be employed with existing equipment.

A further object is to provide a selective counter for radioactive hydrogen which will be relatively insensitive to other radioactive substances, ambient humidity, pressure and temperature.

A still further object is to provide a simple, efficient, inexpensive method for the selective detection and counting of radioactive hydrogen while in the presence of other radioactive substances.

Other objects and advantages will be apparent from the following description of an embodiment of the invention and the novel features thereof will be particularly pointed out hereinafter in connection with the appended claims.

Figure 1:
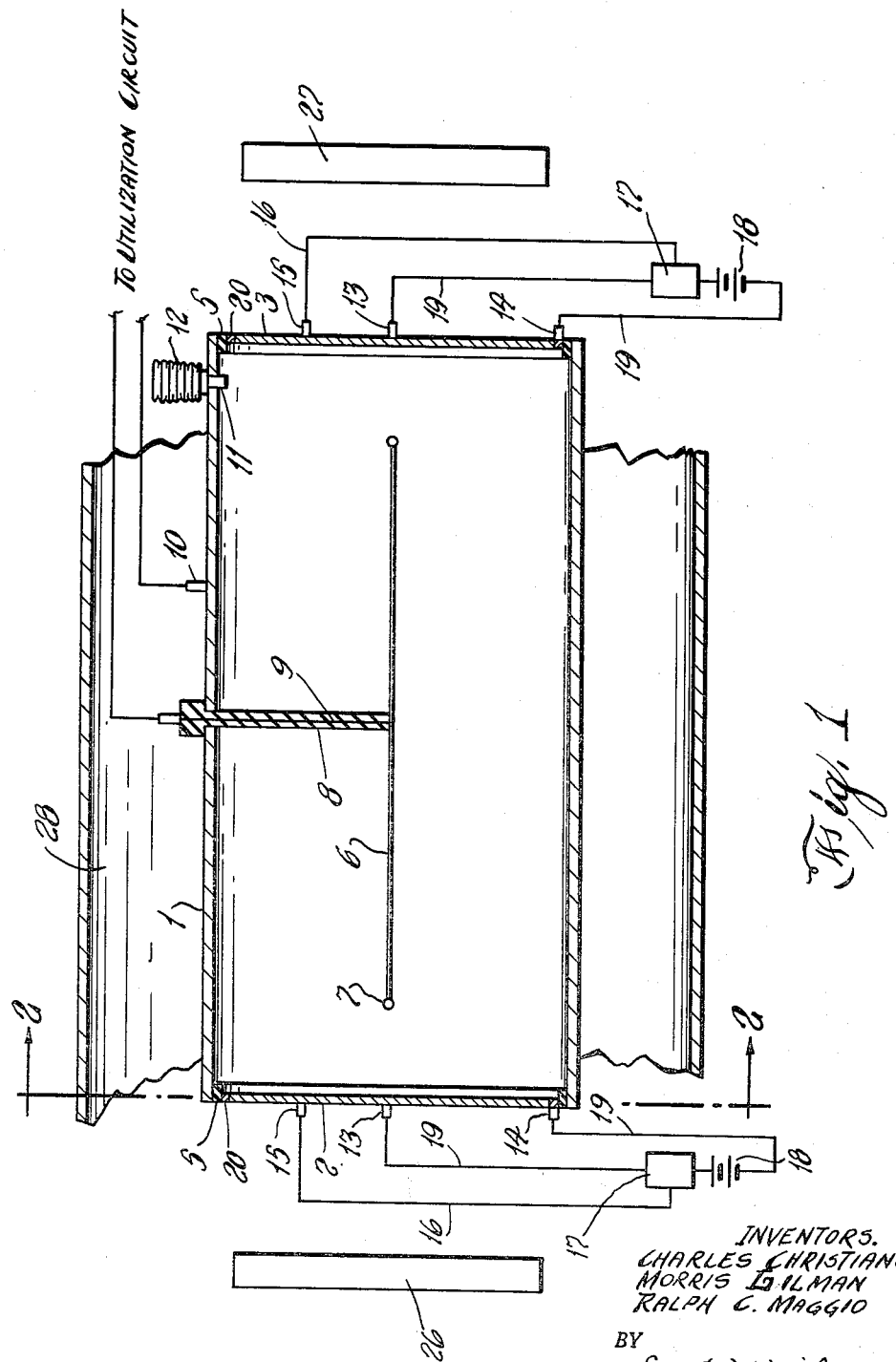
FIG. 1 is a cross-sectional plan of one embodiment made in accordance with this invention.

In the embodiment of the invention illustrated in FIG. 1, a cylindrical metallic tube or envelope 1 of any suitable good electrical conductor, is open at both ends and has these open ends closed by thin metallic windows 2 and 3. These windows may be of any suitable metal, but the most satisfactory results have been obtained where nickel or palladium is employed. However, stainless steel, zinc, iron and platinum can also be used although not rendering as good results as the two previously mentioned metals. The windows are both electrically and thermally insulated from the tube 1 by ring insulators 5 of any well-known material sealed to the peripheral edges of the windows and inner end portions of the tube. A wire-like anode 6 extending axially lengthwise within the tube and is provided with a glass or ceramic bead 7 at its tip ends in order to prevent any electrical discharge or breakdown between the end of the anode and any surface spaced therefrom but proximate thereto, is supported centrally by an insulated support 8. The anode extends the approximate length of the tube but ends just short of the windows 2 and 3 and is provided with an electrical connection central of the anode, which includes a wire 9 extending from the anode along the support 8, passes through and beyond the tube, is electrically insulated therefrom and hermetically sealed thereto for electrical connection to external circuitry. An electrical terminal 10 is attached to the metallic tube 1 at any convenient point along its periphery and also connected to external circuitry (not shown) which in its boradest terms can be referred to as a utilization circuit. An example of this might be any well-known electronic device used with Geiger-Muller tubes for detection, and counting. The entire tube, if desired, may be covered with a ceramic or glass coating (not shown) for protection, except the windows 2 and 3. The metallic tube 1 may now be considered the cathode with a central axial anode 6 so that in effect we have a device similar in certain respects to a Geiger-Muller tube with the utilization circuit supplying the high voltage between anode and cathode. The device above-described may be easily fabricated and provided with an aperture 11 through the wall of the metallic tube 1 at some convenient location. The tube is now hermetically sealed except at the aperture 11 and a counting gas is introduced into the device through this aperture and all the atmosphere purged therefrom and the counting gas substituted therefor. The gas within the device is maintained at approximately ambient pressure and while in this condition a bellows 12 affixed across the aperture 11 in order to provide pressure compensation or equalization between the outside atmosphere and the interal counting gas pressure. The bellows may be of ordinary construction or where conditions require of any special purpose design. The counting gas employed need only meet certain special requirements, namely, that it not chemically react with uncombined hydrogen, be non-corrosive with respect to the metals and substances forming the container or enclosure and be able to withstand an elevated temperature without any adverse affects. Generally counting gases used in Geiger-Muller tubes satisfy these conditions as for example, a gas composed of a high percentage of inert gas plus a small percentage of a quenching gas. Specific mixtures can be, for example, approximately 99% helium and 1% isobutane or 99% argon and 1% methane. Although the percentages and gases may be varied to some extent the above mixtures have been found quite satisfactory.

Figure 2:
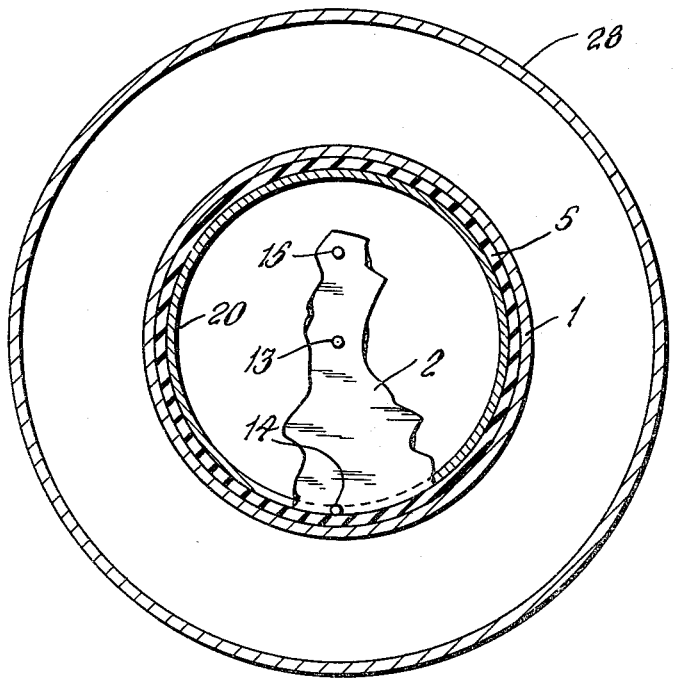
FIG. 2 is a cross-sectional plan approximately along line 2—2.

The metallic windows 2 and 3 sealing the ends of the tube 1 are approximately 1 to 5 mils in thickness depending on the selectivity, metal, and response required. Where the windows are extremely thin they may be supported by a wire mesh or the spokes of a wheel-like support (not shown) disposed across the end of the tube. These windows are heated by attaching electrodes to the outer face of each window and passing a current therethrough. FIGS. 1 and 2 clearly show one electrode 13 located approximately at the center of each window and another electrode 14 attached to the peripheral edge of the window. In order to obtain uniform heating of each window, electrode 14 should be affixed to the entire peripheral edge of the window. This can be accomplished by inserting or interposing a ring 20 of an excellent electrical conductor such as silver, gold, or copper between the insulator 5 and the window to which the electrode 14 is connected. As an alternate, the outer peripheral edge of the window can be coated with a good electrical conductor and the electrode circumferentially connected thereto. A temperature sensing element 15 is disposed on or proximate to the surface of the window preferably midway between the center and the outer edge of the window and connected by wire 16 to a control unit 17. The control unit and the sensing element, as for example, a thermocouple together can be thought of as a thermostat similar to that ordinarily used in homes and buildings except that the temperature range is somewhat greater. The control unit forms part of a series circuit comprising a current source, as for example, a battery 18 or a power supply, wire 19, electrode 14, the window, electrode 13, wire 20, the control unit 17. The control unit in response to temperature of the window sensed by the thermocouple or sensing element will control the current through the window and may be selectively adjusted to maintain any desired window temperature. This circuitry is well known in the art. It has been found that window temperatures between approximately 200° C. and 500° C. produce the most useful and efficient results although not restricting the useful range of the device. FIG. 2 clearly illustrates the physical arrangement of the window and the relative locations of the electrodes and the sensing element. It is desirable that all the electrical contacts be of a low resistance type and that the window be firmly supported and hermetically attached or cemented to the ring 20 which in turn is attached to the tube. This arrangement of parts may be altered, as for example, the insulator 5 deleted and the ring 20 cemented directly to the tube providing the cement or adhesive employed is a good electrical insulator and can withstand the elevated temperatures at which the window is operated.

Figure 3:
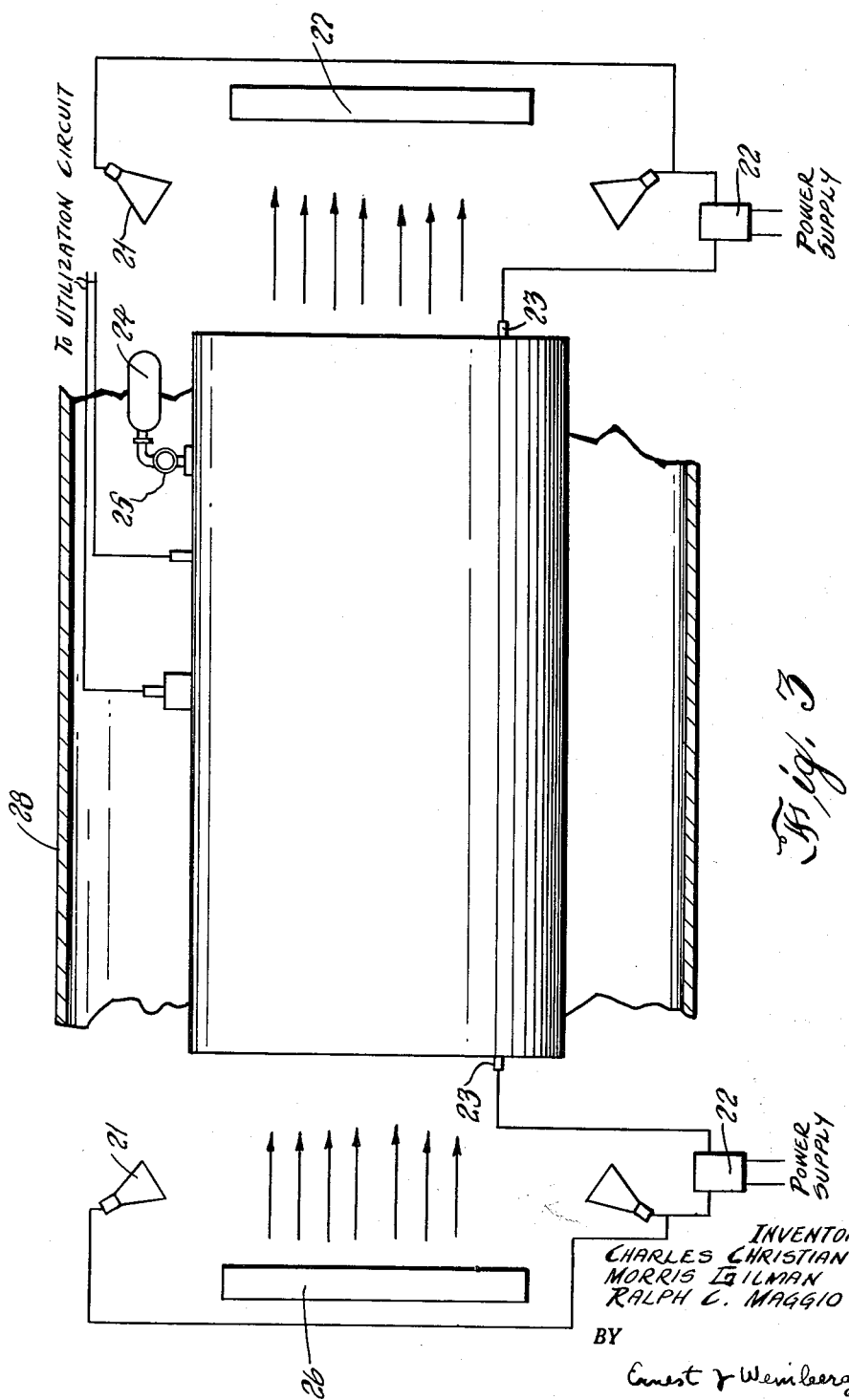
FIG. 3 is a front elevation of another embodiment made in accordance with this invention.

The embodiment illustrated in FIG. 3 is similar to that of FIG. 1 except that another form of heating the windows is employed and a reservoir of counting gas is substituted for the bellows. The windows are heated by a number of heat lamps 21 such as infra-red lamps disposed so that their radiated energy impinges upon the windows without interfering with the movement of atmosphere against the windows. The number and the heating capacity of the lamps is chosen to permit a wide range of window temperatures and the lamps are wired in series with a control unit 22 similar to the one previously mentioned. The sensing element 23 disposed adjacent or in contact with the outer window serves in conjunction with the control unit to maintain a selected window temperature by controlling the power input to the lamps from an electrical power supply. The control systems are similar for both windows and operated independently of one another, although they may be easily operated through a common power supply and control unit. The bellows 12 of FIG. 1 has been replaced by a tank 24 or reservoir of counting gas and connected to the interior of the tube 1 by way of a valve 25. The valve permits the introduction of counting gas into the tube for maintaining the necessary pressure and for replacement of any counting gas that may have escaped or become dissipated in other ways. It is preferable, however, to employ both the reservoir and the bellows and excellent results, long life of the device are thereby achieved.

In the embodiments illustrated in FIGS. 1 and 3 a blower fan 26 is provided to supply a forced blow of atmosphere against the window 2 and thereby create a positive air pressure at or near the surface of this window. Disposed and facing the other window 3 is an exhaust fan 27 which creates a negative pressure at this window so that both fans are working together to induce a flow of atmosphere lengthwise through and around the tube. It is evident that these fans can be used singly or together with similar results except that their capacities would have to be modified. In order to restrict a good portion of the atmosphere to pass through the tube a duct 28 surrounding the tube is provided.

In operation, where a sample of atmosphere is to be examined for radioactive, uncombined hydrogen, the suspect atmosphere is introduced against the surface of one of the windows 2 by first passing through the blower fan 26. On contact with the heated window 2, the molecule in the atmosphere diffuses through the heated window or is aided therethrough by the pressure differential created by the fans between the ends of the tube. The hydrogen passes through the window, which excludes the passage therethrough of other gases to a ratio of approximately 2000:1 for nickel or palladium, so that hydrogen is essentially the only gas entering the tube. The window is made thin in order to permit the relative free diffusion access therethrough of the radioactive hydrogen and its thickness limited to a great extent on the ability to fabricate thin metallic membranes and to heat them without adversely affecting their operability. It is best not to heat a paladium window in excess of 300° C. although nickel may be operated at much higher temperatures, in fact, successful diffusion has been demonstrated at 1000° C. with considerably less efficiency. The diffusion of gases through metals as employed herein depends on first a selection of the metal, its selectivity, operating temperature, ease of fabrication, thickness and the overall conditions under which the device is to be used. Nickel and palladium differ in some respects as to their mechanical properties and workability and a mechanic skilled in the art who has worked with these metals would experience little difficulty in fabricating the structure of the device. Once the radioactive hydrogen has entered the interior of the tube it will produce a pulse which is detected and counted by the utilization circuit with the same relative circuitry and operation as is well known in Geiger-Muller counters.

The volume of atmosphere passing through the device, the total volume of the tube, are two of the factors as well as window temperature which must be considered when the device is calibrated in order to provide accuracy, selectivity and sensitivity. It is clear that the operation of the device will be unaffected by ambient or pressure due to heat, temperature of the atmosphere, humidity or contents of the sampled atmosphere.

It will be understood that various other changes in the steps, details and materials which have been herein disclosed in order to explain the nature of this invention may be made by those skilled in the art within the prin-

We claim:

1. A device for detecting and counting chemically uncombined radioactive hydrogen which may exist in an atmosphere to be sampled and in which other radioactive gases may be present which comprises an envelope having a plurality of spaced apart openings in the walls thereof, means closing and sealing said openings permeable to radioactive hydrogen and substantially impermeable to other fluids, an anode and a cathode spaced apart and disposed within said envelope, a counting gas within said envelope, means for causing a flow of said atmosphere to be sampled against one of said means at a selected pressure whereby radioactive hydrogen in said atmosphere may be detected and counted by and within said device when a utilization circuit is connected thereto.

2. The device according to claim 1, wherein said closing means is a thin metallic closure member.

3. The device according to claim 2, wherein said thin metallic member is of nickel.

4. The device according to claim 2, wherein said thin metallic member is of palladium.

5. The device according to claim 2, wherein said device also includes heating means for elevating and maintaining said metallic closure member at a selected elevated temperature.

6. A device for detecting and counting chemically uncombined radioactive hydrogen which may exist in an atmosphere to be sampled and in which other radioactive gases may be present comprising an envelope having a pair of openings in opposite walls thereof, said openings being hermetically sealed by thin metallic closure members and electrically and thermally insulated from the walls of said envelope, means for heating said closure members and maintaining their temperature at a selected value, an anode and a cathode spaced apart and disposed within said envelope, a counting gas within said envelope, pressure compensating means to maintain a selected pressure within said envelope independent of the pressure of said atmosphere to be sampled when said metallic closure members are heated, means for causing a flow of said atmosphere to be sampled against one of said closure members at a selected pressure whereby radioactive hydrogen in said atmosphere will enter said envelope therethrough and may be detected and counted therein when a utilization circuit is connected to said device.

7. The device according to claim 6, wherein said means for heating includes a source of controllable electric current connected across said closure members for current flow therethrough.

8. The device according to claim 6, wherein said means for heating includes an electric lamp disposed exterior of said device and directed so as to heat said members and a temperature controlling and sensing device for controlling the heat output of said lamps in response to the temperature of said member.

9. The device according to claim 6, further including a reservoir of counting gas, a valve connected thereto in communication with the interior of said envelope for selectively admitting counting gas into said envelope.

10. The device according to claim 6, wherein said means for causing a flow is a blower external of said envelope and supported opposite and spaced from one of said members.

11. A device for detecting and counting radioactive hydrogen which is chemically uncombined with another element and may exist in an atmosphere to be sampled and in which other radioactive gases may be present comprising a metallic tube hermetically closed at both ends by a thin metallic sheet electrically and thermally insulated from said tube and approximately 1 to 5 mils thick and each sheet provided with a pair of electrode contacts one at the center thereof and the other connected to the peripheral edge of said sheet, a source of electric current connected across said electrodes to elevate the temperature thereof and in series with an element for selectively controlling the current to be passed through said electrodes and responsive to the temperature of said sheet, a portion of the wall of said tube formed to provide a bellows for equalizing the pressure within and without said tube, an anode coaxial supported within said tube having its ends beaded and extending between but short of said sheets, said metallic tube being a cathode and having an opening through which an electrical connection is made to said anode and which is insulated therefrom and hermetically sealed whereby when said atmosphere to be sampled is flowed against one of said heated sheets, radioactive hydrogen therein will pass through said sheet and into said device and may be detected and counted therein when a utilization circuit is connected to said anode and cathode.

12. The device according to claim 11, wherein the temperature to which said sheets are elevated is approximately between 200° C. and 500° C.

No references cited.